United States Patent Office

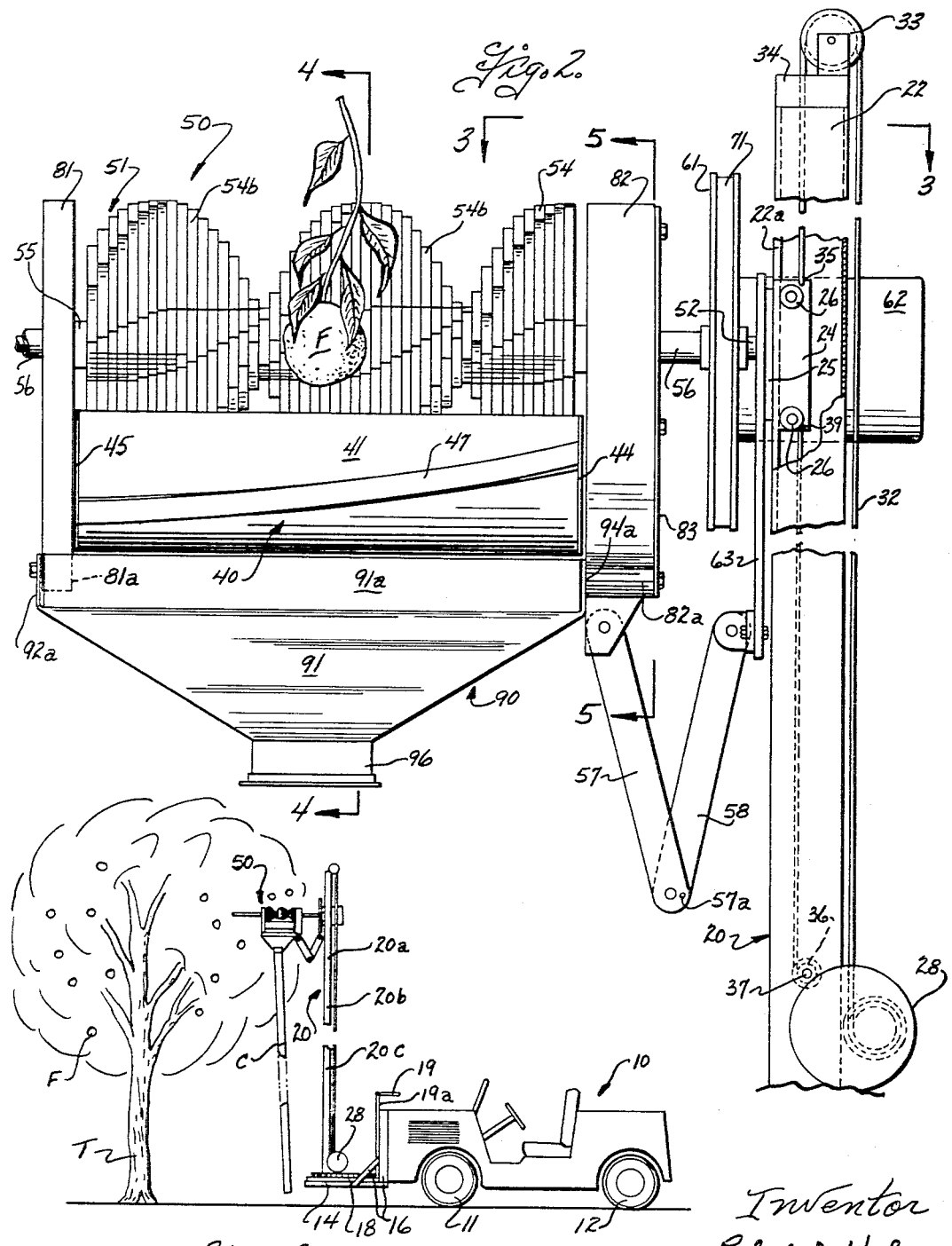

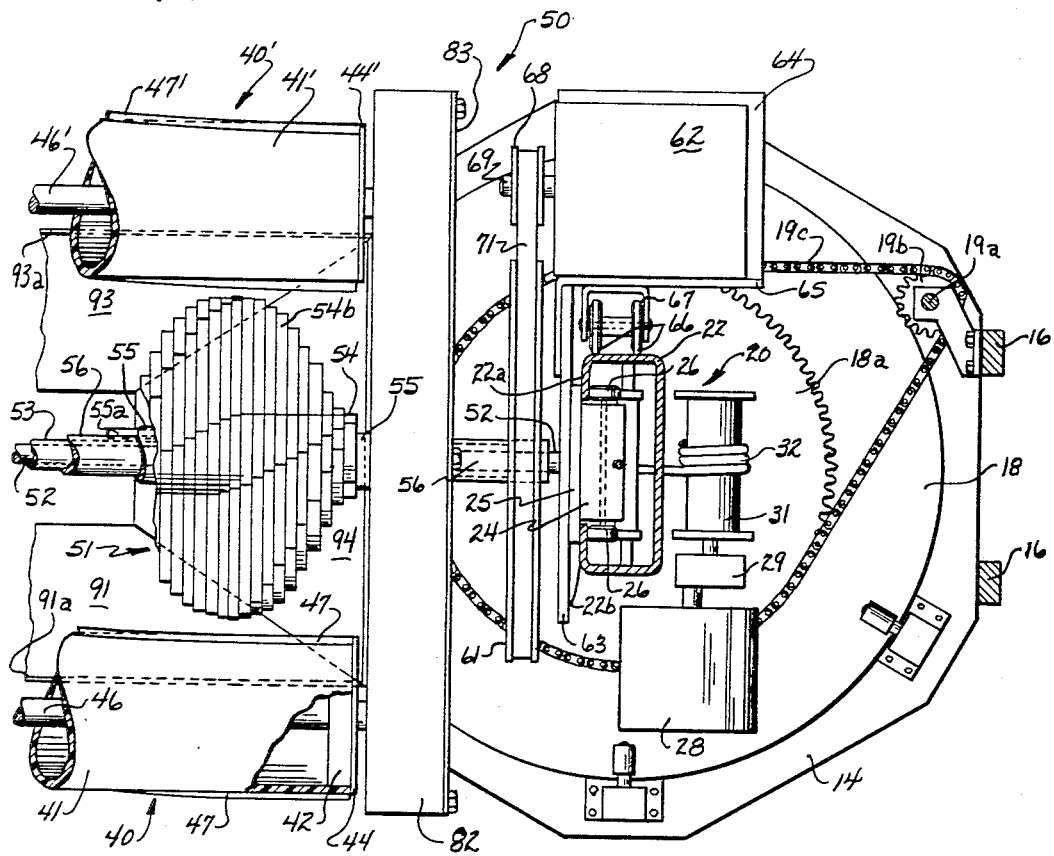
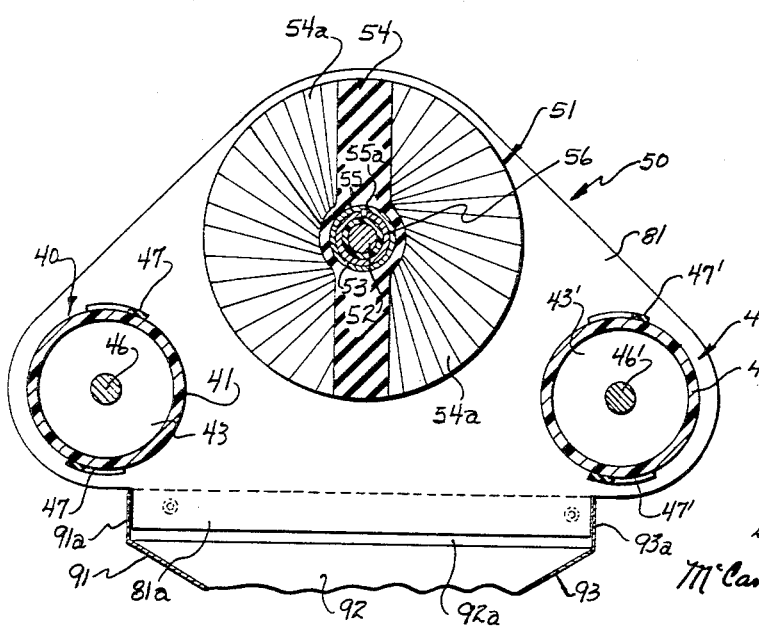

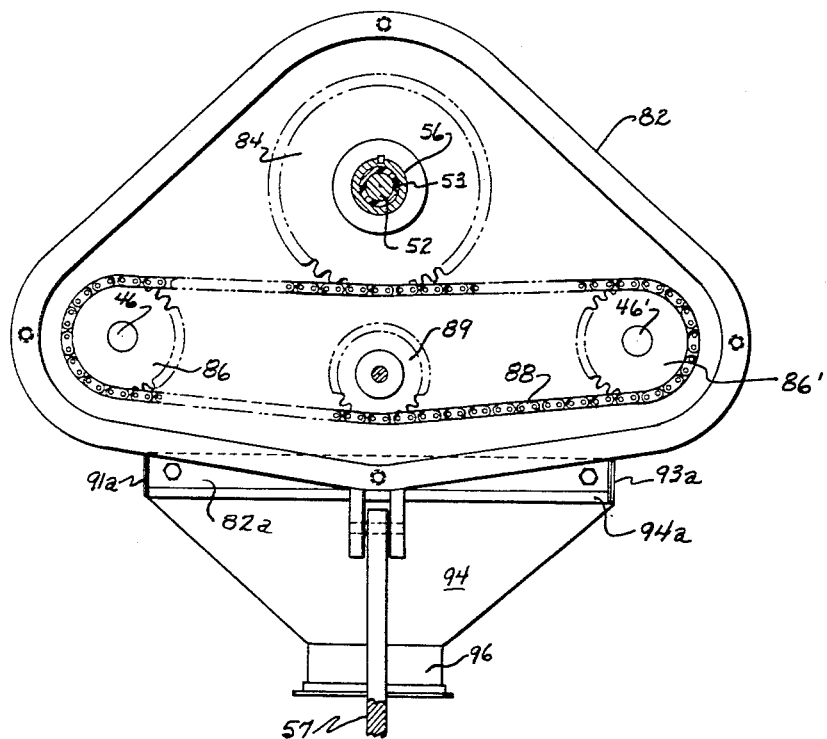

3,413,786
Patented Dec. 3, 1968

3,413,786
FRUIT HARVESTER
Robert D. Wehr, Rte. 6, Box 1736,
Lakeland, Fla. 33801
Continuation-in-part of application Ser. No. 523,069,
Jan. 26, 1966. This application Mar. 29, 1967, Ser.
No. 626,767
18 Claims. (Cl. 56—328)

ABSTRACT OF THE DISCLOSURE

A truck mounted boom has a cantilevered harvesting head movably mounted thereon. The harvester head includes a rotatable screw-shaped member and smaller tubular members at either side to feed fruit thereto for harvesting. The tubular members are rotated in the opposite direction of the screw-shaped member. The entire harvester head is movable along a cantilevered shaft.

---

This application is a continuation-in-part of application Ser. No. 523,069, filed Jan. 26, 1966, now abandoned.

This invention relates to fruit harvesters and more particularly to a new and useful apparatus for harvesting fruit from a tree.

It is an object of the present invention to provide an apparatus adaptable for harvesting a wide variety of fruits.

Another object is to provide an apparatus for harvesting fruit by shearing it from the stems without damaging the fruit.

Still another object of the invention is to provide a fruit harvester having a new and useful harvesting head which is quite maneuverable, which is practical, and which is of relatively simplified construction.

Yet another object is to provide a fruit harvester in accordance with the foregoing objects, particularly adapted for harvesting citrus fruits, and which can readily harvest fruits in the "canopy" area of the citrus tree.

Other objects and advantages of the invention will be apparent from the following description taken in conjunction with the accompanying drawings wherein:

FIGURE 1 is a schematic view illustrating one form of application and operation of the present invention;

FIG. 2 is a partial side elevational view, on a larger scale, illustrating a preferred embodiment of the invention and having a portion broken away to better illustrate the parts;

FIG. 3 is a sectional view taken generally along plane 3—3 of FIG. 2 and having some parts broken away for better illustration;

FIG. 4 is a sectional view taken along plane 4—4 of FIG. 2; and

FIG. 5 is a sectional view taken along plane 5—5 of FIG. 2.

In the drawings, wherein for the purpose of illustration is shown a preferred embodiment of the invention, the numeral 10 designates a vehicle such as a tractor conveniently provided with front wheels 11 and rear wheels 12. A support platform 14 is mounted on the vehicle in any convenient manner as, for example, by means of a bracket 16 herein shown adjacent the front of the vehicle. A turntable 18 is conveniently rotatably mounted on the support platform and oscillated by a manual crank 19 at the front of the vehicle. For this purpose, a turntable sprocket 18a is mounted on the turntable and is drivingly connected to crank 19 by means of shaft 19a, sprocket 19b, and chain 19c (see FIG. 3). It is contemplated that a reversible motor, or other means, may be used for rotating the turntable, if desired. A boom assembly, generally designated by the numeral 20, is mounted on the turntable in any secure manner and extends generally upward therefrom to a height desired. As best shown in FIG. 1, the boom is formed of three sections 20a, 20b, and 20c connected in any convenient manner. The middle section 20b is selectively removable to adjust the length of the boom, if desired. It is contemplated that additional sections may be used or that the boom be otherwise adjustable in length. A harvester head, generally designated by the numeral 50, is slidably mounted on the boom for selective movement therealong in a manner hereinafter described. Means is provided for rotating the harvester head to shear fruit F from a tree T in a manner which will hereinafter be described. Thus, by bodily movement of the vehicle 10, together with the selective movements of turntable 18 and harvester head 50 along boom 20, the fruit harvester may be moved to selected areas whereby such successive locationings will cause the harvester to shear fruit from the tree and gather the same without individual or manual manipulation of the fruit or branches and stems. A suitable receiving means such as a flexible chute C is positioned for receiving the picked fruit. Alternatively a bag may be used, or a guide may be positioned to receive the picked fruit and guide or convey it to appropriate receiving containers.

Referring now to FIGS. 2 and 3, the boom 20 includes an elongated tubular member 22 herein shown as having a generally rectangular section including flanges 22a and 22b which are spaced apart to define an elongate slot extending generally the full length of the boom. A member or block 24 is mounted in the slot for movement therealong. For this purpose, a sliding plate 25, having a width wider than the slot, is affixed to the block and engages the outer surface of flanges 22a and 22b. A plurality of rollers 26 is rotatably mounted on the block for engaging the inside of flanges 22a and 22b. While it is contemplated that other arrangements may be utilized to effectuate a slidable member mounted on the boom, the aforedescribed apparatus is an exemplary arrangement for this purpose. Movement of the block along the boom is conveniently accomplished by means of reversing motor 28 conveniently mounted on turntable 18. The motor operates through gear box 29 to selectively rotate drum 31 around which is wound several turns of cable 32 to effectuate positive movement of the cable as the drum is rotated. The cable conveniently extends upwardly to a pulley 33 mounted adjacent the upper end of the boom as by bracket 34 (FIG. 2). From the pulley, the cable extends downwardly to the block 24 and has one end secured thereto as by fastener 35. Another pulley, herein illustrated as a relatively wide pulley 36 mounted on shaft 37 adjacent the lower end of the boom, is positioned adjacent drum 31 and the cable 32 extends therearound and upwardly to block 24. The other end of cable 32 is affixed to the lower end of the block as by fastener 39. It should be understood that other shapes of booms may be utilized and that means other than cables may be utilized for shifting the position of member 24 along the boom. It is important, however, that member 24 may be selectively positioned in elevation by an operator. Controls for such positioning are conveniently located on the vehicle.

Harvester head 50 is mounted on member 24 and preferably extends outwardly therefrom in a cantilevered position. In the embodiment illustrated, the harvester head 50 includes a first member 51 having a plurality of elements 54 shaped as best shown in FIG. 4. These elements are laminated in staggered relationship to provide a generally screw-shaped member. The laminated elements 54 are secured to a tubular shaft 55 which is slidably mounted on a second tubular shaft 56. The second tubular shaft 56 is rotatably mounted on an outwardly extending shaft 52. Shaft 52 is secured to block or member 24 in any convenient manner and operates to support the harvester head 50. A bearing 53 of suitable material is interposed between shaft 52 and rotatable shaft 56. First tubular shaft 55 is operatively connected to rotatable shaft 56 as by a key 55a. Preferably, shafts 52 and 56 have lengths longer than the screw-shaped member (see FIG. 1) so that the harvester head may be moved a distance longitudinally thereof. This provides additional maneuverability of the harvester head 50 and allows it to be inserted between the tree branches while the boom is spaced from the branches. Longitudinal movement of the harvester head 50 is accomplished by means of arms 57, 58 (see FIG. 2) pivotally connected to each other. Arm 57 is pivotally connected to the harvester head 50 and arm 58 is pivotally connected to a support member 63 which is secured to sliding plate 25. Thus, extension or retraction of arms 57 and 58 will move the harvester head 50 along shaft 56. The movement is relative to the support member 63 and thus relative to the boom 20. Arm 57 has a rounded projection adjacent the surface of arm 58. This is evidenced by the depression designated 57a in FIG. 2. Arm 58 has a plurality of receivers (not shown) for engaging the projection to hold the arms in various extended positions. Arms 57 and 58 may be moved in any convenient manner, either manually or by any desired mechanical apparatus.

When the harvester head 50 is maneuvered as described above, and the head is inserted between the branches to harvest the fruit, the fruit may be picked by mere rotation of the screw-shaped member 51. When the member 51 comes into proximity of a fruit F, as illustrated in FIG. 2, and the member is rotated, the fruit is first pulled in a horizontal direction by the threads thereby tensioning the stem. Preferably means is provided on the surface of the threads to impart a twisting to the fruit, in addition to the pulling, to shear the fruit from the stem. This is accomplished by the unique shape of the laminated head. As mentioned, the staggered relationship of the elements 54 provides the screw shape of the harvester head. Additionally, this staggered relationship provides a plurality of teeth on the surface of the threads formed by exposed faces 54a (FIG. 4) which lie in radial planes generally perpendicular to the axis of the screw, and by faces 54b (FIGS. 2 and 3) which lie in planes perpendicular to the radial planes and parallel to the screw axis. By reason of the staggered relationship of the elements 54, radical teeth are provided and the juncture of faces 54a and 54b provides an apex of approximately 90°. As can be seen in FIG. 2, as the harvester head is rotated, each face 54b is moved in a plane generally perpendicular to the axis and will engage the fruit as it swings through this plane. When such engagement is made, the fruit is twisted and thereby sheared from the stem. To prevent damage to the fruit during this picking action, the elements 54 are preferably made of a generally resilient material having a resiliency which will hereinafter be discussed. While the harvester head is described as being formed of a plurality of elements 54 laminated in staggered relationship, it is contemplated that the head may be molded in this shape or the teeth otherwise formed and that the recitation of the structure is exemplary.

As indicated above, the apparatus of the present invention can be utilized for harvesting various fruits from a tree; for example, hard fruits such as nuts and soft fruits such as peaches. It is, however, particularly adapted for harvesting citrus fruits, and the fruit illustrated in the drawings is an orange. The best oranges, from a consumer's standpoint, grow in the outer area of the tree known as the "canopy" which is ordinarily about three feet thick. As a consequence, the screw-shaped member 51 is preferably arranged to operate over a distance about three feet in length to be able to easily harvest fruit in the area of the canopy. The depth of the threads from the outer periphery to the portion adjacent the shaft, is preferably at least as great as the average diameter of the fruit. Likewise, the distance between thread spacing is about twice the average diameter of the fruit to allow the fruit to be easily received between adjacent threads. These dimensions will vary according to the type and size of fruit being harvested. As stated above, the resiliency of the material may be varied for the various fruits being picked. I have found that durometer hardness approximately in the range of 20 to 40 is acceptable for most fruits. This may be varied within the spirit of the present invention and any suitable material may be utilized. The hardness may be also varied somewhat with variations in speed of the shaft. In general, however, the larger the material being harvested the larger the thread spacing and depth and the slower the speed of the harvester head's rotation. Conversely, for very small fruit, such as nuts, the harvester head may be rotated quite fast. The screw-shaped member 51 may be used alone and maneuvered into engagement with fruit to be picked, as described above. It is contemplated that a plurality of screw-shaped members 51 may be used, if desired. It has been found that member 51 is somewhat more efficient if means is provided to guide or feed the fruit into engagement with member 51. A preferred type of feed means is illustrated as a second member, generally designated 40. The embodiment illustrated includes a tubular portion 41 preferably made of neoprene, resilient plastic, or other resilient material. Tubular portion 41 is secured at either end to supports 42, 43 as by an adhesive or other fastening means. End flanges 44 and 45 (see FIG. 2) are located at either end of the tubular portion to provide a protective edge. Supports 42, 43 and end flanges 44, 45 are mounted on a rotatable shaft 46 as by a pressed fit. A pair of ribs 47 about ¼" in thickness and conveniently made of the same material as tubular portion 41 are affixed to the periphery thereof in any convenient manner, or may be integral therewith. The ribs are preferably in a generally flat helix and are operative to urge the fruit toward the screw-shaped member 51. The helix of the ribs 47 and the helix of member 51 are preferably inclined in the same direction. Thus, when members 40 and 51 are rotated in opposite directions as hereafter described, the helixes are operative in opposite directions. More or less ribs can be used or there may be identations on the surface; however, the illustrated form is preferred.

In the present embodiment, tubular member 41 is mounted for rotation about an axis generally parallel to shaft 52 and adjacent the lower edge of the screw-shaped member. As shown, tubular member 41 is one-half the diameter of the screw-shaped member and is rotated in the opposite direction at twice the speed, as hereinafter described. Thus, the peripheral speed of the members is identical. If desired, however, tubular member 41 may be as large or larger than member 51 and they may be rotated at different peripheral speeds. The spacing of members 41 and 51 is preferably less than the diameter of the fruit being harvested, and is selected for proper feeding of a given size fruit. The resiliency of member 41 and its ribs 47 assures that no pinching of the fruit will occur.

As illustrated, a third member, generally designated 40', is located at the opposite side of the screw-shaped member 51 from member 40. Third member 40' has the same function as member 40 when the screw-shaped member 51 is rotated in the opposite direction to pick fruit at said opposite side. Third member 40' is identical to member 40 and the same parts have the same numeral designations followed by the postscript prime (').

Second and third members 40 and 40' are rotatably mounted in spaced relation to screw-shaped member 51. As shown, an end plate 81 is located at the outer end of the harvester head 50. Tubular shaft 55 and shafts 46, 46' are rotatably mounted on the end plate 81. At the other end, shafts 55, 46, and 46' are rotatably mounted in the wall of housing 82. A sprocket 84 is secured to tubular shaft 56 for rotation therewith and sprockets 86, 86' are likewise secured to shafts 46, 46', respectively. A chain 88 is entrained over sprockets 86, 86' and an idler sprocket 89. Chain 88 is operatively engaged with sprocket 84 to drive sprockets 86, 86' in response to rotation of shaft 56 and in the opposite direction. Obviously, other means can be utilized to drivingly connect the second and third members 40, 40' with screw-shaped member 51. A cover plate 83 (see FIGS. 2 or 3) is conveniently provided to close the housing 82.

Means is provided for rotating the harvester head members, and an advantageous mechanism is illustrated in FIGS. 2 and 3. As shown, a pulley 61 is mounted on tubular shaft 56 adjacent the end nearer the boom. A reversible motor 62 is conveniently mounted for movement along the boom with the movement of member 24. As shown, a support member 63 is secured to plate 25 and a motor support platform 64 is attached to the support member as by bracket 65. In this manner, the motor 62 is moved along the boom when block 24 is moved. A pair of wheels 66 is conveniently mounted on bracket 65 by means of another bracket 67 and conveniently engage the side of boom 20 to remove any unnecessary friction as the motor is moved therealong. A motor pulley 68 is mounted on motor shaft 69 for rotation therewith, and a belt 71 connects pulley 68 to pulley 61. It is now deemed obvious that the shaft 56 will be rotated when motor 62 is rotated; however, it is contemplated that other forms of driving the harvester head may be utilized.

Means is provided for collecting the fruit as indicated above. In the embodiment illustrated, end plate 81 has a depending portion 81a and housing 82 has a depending portion 82a. A trough or funnel, generally designated 90, is attached to these depending portions 81a, 82a, as by fasteners, and directs the picked fruit to chute C. As shown, funnel 90 has inclined sides 91–94 and a flanged outlet member 96 at the bottom of the sides. It can be seen that a guide or chute C can be easily connected to flanged member 96. Each side has an upwardly extending portion designated 91a–94a in the drawings. Portions 92a and 94a are secured to depending portions 81a and 82a, respectively.

It is now deemed obvious that the present invention provides a fruit harvester adaptable for harvesting a wide range of fruits by shearing them from the stem without damaging the fruit. It is also deemed obvious that the fruit harvester has a novel harvesting head which can be used singly or with other rotating members, which is practical, and which has relatively simplified construction.

While I have thus described a preferred embodiment of my invention, this has been done by way of illustration and not limitation, and I do not wish to be limited except as required by the appended claims.

What is claimed is:

1. A fruit harvester including: a movable support; harvester head means mounted on the support and including a rotatable, axially elongated screw-shaped structure having thread means thereon for engaging the fruit as the screw-shaped structure is rotated to remove the fruit from the stem; said thread means having a thread depth and axial thread spacing for receiving a fruit between successive threads; and thread means having a plurality of teeth on the surface thereof; each of the teeth having a plurality of faces, one face generally parallel to the axis of the screw-shaped structure; and means operatively connected to the screw-shaped structure for rotating the same about its axis.

2. A fruit harvester as set forth in claim 1 wherein the screw-shaped structure is a double-threaded screw.

3. A fruit harvester as set forth in claim 1 wherein said teeth are generally radial and each has an apex of approximately 90° formed by said one face and another face generally perpendicular to said axis.

4. A fruit harvester as set forth in claim 1 wherein the screw-shaped structure is a double-threaded screw comprising a plurality of elements having a generally rectangular cross section and laminated in staggered relationship whereby an edge of the element forms said one face.

5. A fruit harvester as set forth in claim 1 wherein the thread depth is at least as great as the approximate diameter of fruit being harvested and the thread spacing is generally twice the approximate diameter of said fruit.

6. A fruit harvester as set forth in claim 1 wherein the teeth are formed of resilient material.

7. A fruit harvester as set forth in claim 4 wherein the elements are mounted on a tubular shaft extending generally the full length of the screw-shaped structure, and including a support shaft extending through said tubular shaft and mounted on the support.

8. A fruit harvester as set forth in claim 7 wherein the support shaft is mounted on the movable support adjacent one end of the shaft, and the screw-shaped structure is cantilevered from the movable support.

9. A fruit harvester as set forth in claim 8 wherein: the elements are formed of resilient material, said staggered relationship of the elements forms generally radially extending teeth having an apex of approximately 90° formed by said one face and another face generally perpendicular to said axis, the thread depth is at least as great as the approximate diameter of fruit being harvested, and the thread spacing is generally twice the approximate diameter of said fruit.

10. A fruit harvester as set forth in claim 1 including means at the sides of the screw-shaped structure and spaced therefrom for guiding the fruit into engagement by the screw-shaped structure.

11. A fruit harvester as set forth in claim 1 and including an elongated structure mounted on the support generally parallel to the screw-shaped structure and having approximately the same length, and means for rotating said elongated structure in response to rotation of the screw-shaped structure and in a direction opposite thereto.

12. A fruit harvester including: a support; a rotatable, axially elongated screw-shaped structure mounted on the support and having thread means thereon; said thread means having a thread depth and axial thread spacing for receiving a fruit between successive threads; said threads having means on the surface thereof for engaging the fruit as the screw-shaped structure is rotated to remove the fruit from the stem; means for rotating the screw-shaped structure in one direction for harvesting fruit; a second axially elongated generally cylindrical structure mounted on the support generally parallel to the screw-shaped structure at one side thereof and spaced therefrom; the second structure having means on its surface for engaging the fruit to feed the fruit toward the screw-shaped structure; and means for rotating said second structure in a direction opposite said one direction.

13. A fruit harvester as set forth in claim 12 wherein the support includes an upwardly extending boom; a cantilevered member extending outwardly from the boom and mounted thereon for movement along the boom; and means mounting said structures on the cantilevered member for movement therealong.

14. A fruit harvester as set forth in claim 12 wherein the means on the surface of the second structure includes at least one upstanding rib thereon and extending generally the full length thereof, said rib being made of resilient material.

15. A fruit harvester as set forth in claim 14 including a third structure similar to the second structure and mounted on the side of the screw-shaped member opposite said one side, means for rotating the third structure in the same direction as the second structure, and means for selectively reversing the directions of rotation to harvest fruit from said opposite side.

16. A fruit harvester comprising: a movable support; a harvester head mounted on the support and including a rotatable, axially elongated screw-shaped structure having threads thereon; drive means for rotating the screw-shaped structure about its axis; the threads having a thread depth and axial thread spacing for receiving a fruit between successive threads; and a plurality of teeth on the surface of the threads and each having an elongate surface extending outwardly from adjacent said axis and generally crosswise of the direction of rotation for engaging the fruit as the screw-shaped structure is rotated to remove the fruit from the stem.

17. The combination of claim 16 wherein the elongate surfaces extend outwardly to the outer extremity of threads.

18. The combination of claim 16 wherein the teeth are on both sides of the threads; and including second and third axially elongated structures mounted on the support, one on each side of the screw-shaped structure; the second and third structures being generally parallel to the screw-shaped structure and spaced therefrom; second drive means for rotating the second and third structures in a direction opposite the direction of rotation of the screw-shaped structure for feeding the fruit thereto; and means for reversing the drive means for harvesting fruit at both sides of the screw-shaped structure.

References Cited

UNITED STATES PATENTS

| | | |
|---|---|---|
| 2,475,531 | 7/1949 | Townsend. |
| 2,834,174 | 5/1958 | Suggs et al. 56—33 X |
| 2,855,743 | 10/1958 | Hubbard 56—33 |
| 2,916,868 | 12/1959 | Ramacher et al. 56—328 |
| 3,127,725 | 4/1964 | Richardson 56—328 |
| 3,129,551 | 4/1964 | Lasswell 56—328 |

LUCIE H. LAUDENSLAGER, *Primary Examiner.*